(12) United States Patent  
Coman et al.

(10) Patent No.: US 8,942,064 B2
(45) Date of Patent: Jan. 27, 2015

(54) SENDING A SEISMIC TRACE TO SURFACE AFTER A VERTICAL SEISMIC PROFILING WHILE DRILLING MEASUREMENT

(75) Inventors: Radu Coman, Hannover (DE); Michael Neubert, Braunschweig (DE)

(73) Assignee: Baker Hughes Incorporated, Houston, TX (US)

( * ) Notice: Subject to any disclaimer, the term of this patent is extended or adjusted under 35 U.S.C. 154(b) by 399 days.

(21) Appl. No.: 12/785,991

(22) Filed: May 24, 2010

(65) Prior Publication Data

US 2010/0315901 A1     Dec. 16, 2010

Related U.S. Application Data

(60) Provisional application No. 61/185,875, filed on Jun. 10, 2009.

(51) Int. Cl.
    *G01V 1/40*          (2006.01)
    *G01V 1/48*          (2006.01)
    *E21B 47/00*        (2012.01)
    *G01V 1/42*          (2006.01)

(52) U.S. Cl.
    CPC ........................................ *G01V 1/42* (2013.01)
    USPC ........................................ 367/57; 340/855.5

(58) Field of Classification Search
    USPC ................. 367/21, 23, 57, 63, 83; 340/854.3, 340/855.5
    See application file for complete search history.

(56) References Cited

U.S. PATENT DOCUMENTS

| | | | |
|---|---|---|---|
| 5,684,693 A | 11/1997 | Li | |
| 6,574,563 B1 * | 6/2003 | Nickel | ............................. 702/14 |
| 7,068,182 B2 | 6/2006 | Golla et al. | |
| 2005/0052949 A1 * | 3/2005 | Gaston et al. | ................... 367/57 |
| 2006/0203614 A1 * | 9/2006 | Harmon | .......................... 367/57 |
| 2007/0189119 A1 | 8/2007 | Klotz et al. | |

OTHER PUBLICATIONS

Greenberg, Jerry, "Seismic while drilling keeps bit turning to right while acquiring key real-time data," Drilling Contractor, Downhole Innovations, Mar.-Apr. 2008, pp. 44-45.

* cited by examiner

*Primary Examiner* — Ian J Lobo
(74) *Attorney, Agent, or Firm* — Mossman Kumar & Tyler PC

(57) ABSTRACT

A system, method and computer-readable medium for acquiring seismic data, which includes activating a seismic source at a surface location; defining a seismic trace of a seismic wave received at a downhole location on a bottomhole assembly in a borehole in response to the activation of the seismic source; compressing the seismic trace; and recording the compressed seismic trace to a storage medium.

16 Claims, 5 Drawing Sheets

SENDING A SEISMIC TRACE TO SURFACE AFTER A VERTICAL SEISMIC PROFILING WHILE DRILLING MEASUREMENT

CROSS-REFERENCES TO RELATED APPLICATIONS

This application claims priority from U.S. Provisional Patent Application Ser. No. 61/185,875 filed on Jun. 10, 2009.

BACKGROUND OF THE DISCLOSURE

1. Field of the Disclosure

The present disclosure relates to a method and apparatus for acquiring data in a seismic-while-drilling operation and in particular to transferring data from a downhole location to a surface location.

2. Description of the Related Art

Conventional reflection seismology uses sources and receivers at a surface location and images subsurface layers from reflected seismic energy caused by contrasts in subsurface impedance. An obtained image often suffers in spatial accuracy, resolution and coherence due to the long travel paths between source, reflector, and receiver. In particular, due to the two-way passage of seismic signals with a low, laterally varying velocity through a highly absorptive near-surface weathered layer, subsurface images are often of poor quality.

One technique for overcoming these difficulties is commonly known as vertical seismic profiling (VSP) and images a subsurface in the vicinity of a borehole. VSP measurements made during drilling operations are referred to as Seismic-while-drilling (SWD). In standard SWD exploration, a set of sensors is integrated into a bottomhole assembly (BHA) and lowered into a borehole. The sensors record seismic data from the earth formation in response to seismic energy generated at a surface location. With VSP, a surface seismic source produces signals that are received at a downhole receiver or an array of downhole receivers. This is repeated for different depths of the receiver (or receiver array).

When running a VSP operation, although data is acquired downhole, calculations using the data are generally performed uphole, so that the speed at which data is transferred from the bottomhole assembly to the surface becomes important. In one method, the seismic data is stored at the bottomhole sensor and obtained when the BHA is tripped to the surface. This method suffers from long delays while the BHA is lowered and raised and data is being collected. Alternatively, mud pulse telemetry in which uncoded acoustic signals are produced at the BHA and received at the surface makes it possible for a surface operator to obtain data without removing the sensor from its downhole location and continued collecting data. However, the rate at which data is sent uphole using telemetry is limiting, especially when compared to the large amount of data that typically needs to be sent uphole. Thus, there is a need for improving the speed at which data is communicated uphole in VSP methods.

SUMMARY OF THE DISCLOSURE

The present disclosure provides a method of acquiring seismic data, which includes activating a seismic source at a surface location; defining a seismic trace of a seismic wave received at a downhole location on a carrier in a borehole in response to the activation of the seismic source; and compressing the seismic trace.

The present disclose also provides a system for acquiring seismic data, which includes a seismic source configured to provide seismic energy at a surface location when activated; a receiver configured to receive a seismic wave at a downhole location on a carrier in a borehole in response to the activation of the seismic source; and a downhole processor configured to define a seismic trace of the received seismic wave, and compress the seismic trace.

In another aspect, the present disclosure provides a computer-readable medium having stored thereon instructions that when read by at least one processor cause the at least one processor to execute a method. The method includes defining a seismic trace from a seismic wave received at a downhole location on a carrier in a borehole in response to the activation of a seismic source at a surface location; and compress the seismic trace.

BRIEF DESCRIPTION OF THE DRAWINGS

The present disclosure is best understood with reference to the accompanying figures in which like numerals refer to like elements, and in which.

DETAILED DESCRIPTION OF THE DISCLOSURE

Figure 1:
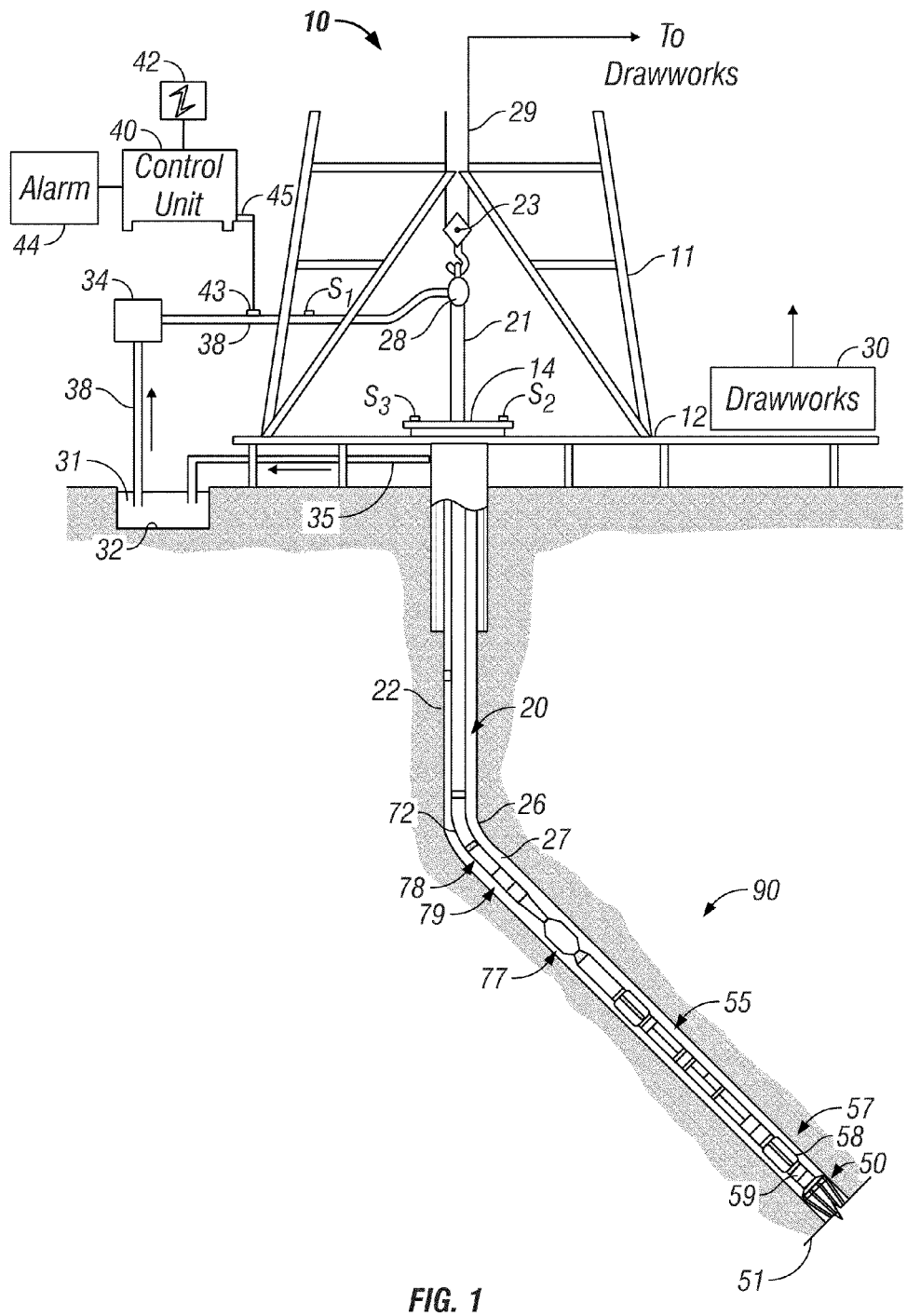
FIG. 1 shows a measurement-while-drilling device suitable for use with the present disclosure.

FIG. 1 shows a schematic diagram of a drilling system 10 with a drillstring 20 carrying a drilling assembly 90 (also referred to as the bottom hole assembly, or "BHA") conveyed in a "wellbore" or "borehole" 26 for drilling the borehole. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the borehole 26 when a drill pipe 22 is used as the tubing. For coiled-tubing applications, a tubing injector, such as an injector (not shown), however, is used to move the tubing from a source thereof, such as a reel (not shown), to the borehole 26. The drill bit 50 attached to the end of the drillstring breaks up the geological formations when it is rotated to drill the borehole 26. If a drill pipe 22 is used, the drillstring 20 is coupled to a drawworks 30 via a kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 28 and kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ placed in the line 38 may provide information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the disclosure, the drill bit 50 is rotated by only rotating the drill pipe 22. In another embodiment of the disclosure, a downhole motor 55 (mud motor) is disposed in the drilling assembly 90 to rotate the drill bit 50 and the drill pipe 22 is rotated usually to supplement the rotational power, if required, and to effect changes in the drilling direction.

In one embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the disclosure, a drilling sensor module 59 is placed near the drill bit 50. The drilling sensor module 59 contains sensors, circuitry and processing software relating to the dynamic drilling parameters. Such parameters can include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the communication sub 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including seismic-while-drilling measurements while the borehole 26 is being drilled. The communication sub 72 obtains the signals and measurements and transfers the signals, using two-way telemetry, for example, to be processed on the surface. Alternatively, the signals can be processed using a downhole processor 77 positioned at a suitable location within or near the drilling assembly 90. In one aspect, processor 77 compresses seismic data for telemetry using the methods of the present disclosure.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 may include a computer or a microprocessor-based processing system, memory for storing programs or models and data, a recorder for recording data, and other peripherals. The surface control unit 40 can be adapted to activate alarms 44 when certain unsafe or undesirable operating conditions occur. In one aspect, the processor of the surface control unit 40 may provide instructions executable by the downhole processor 77 to perform the methods described herein, including interpolation of data received from downhole.

Figure 2:
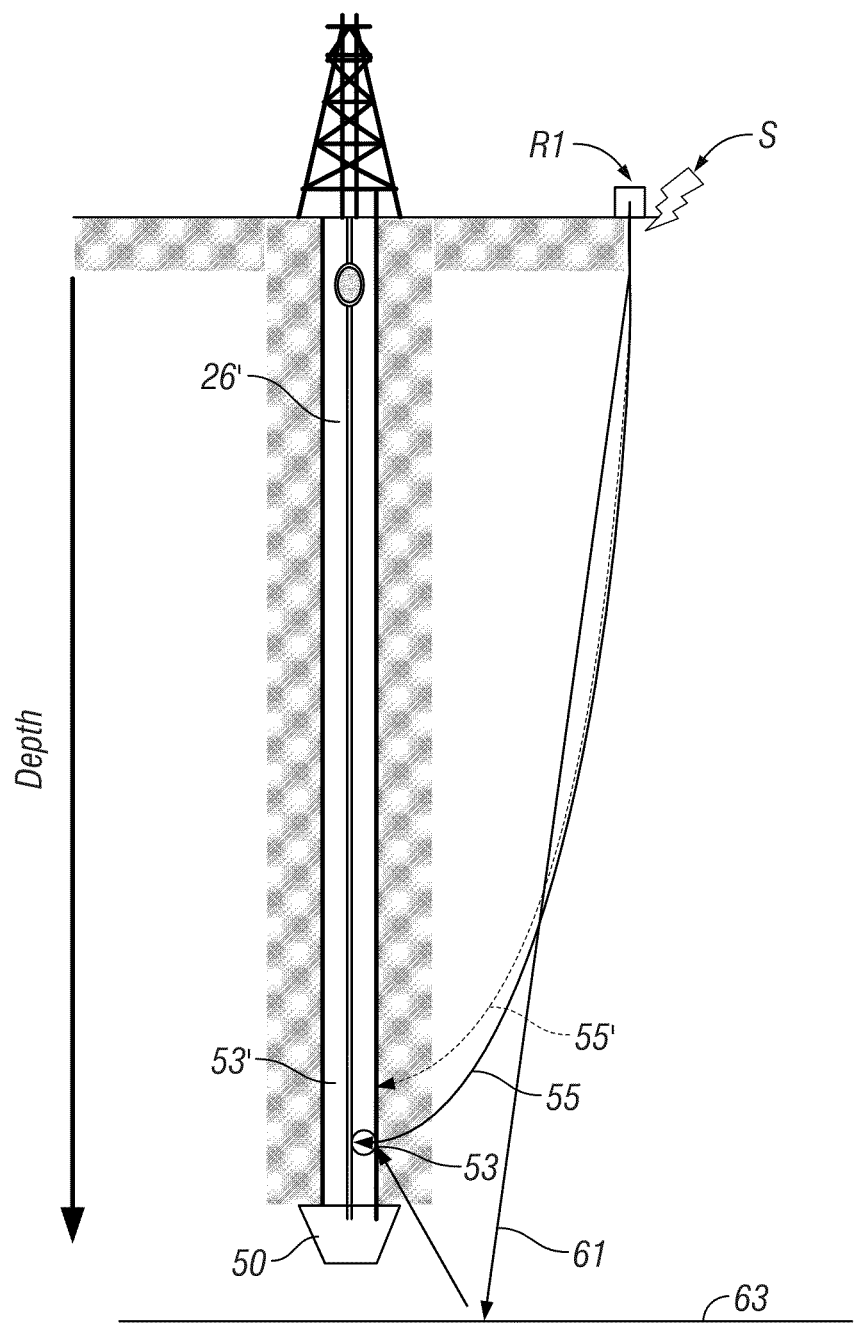
FIG. 2 illustrates the arrangement of source and sensors for the present disclosure.

Turning now to FIG. 2, an example is shown of source and receiver configurations for the method of the present disclosure. Shown is a drillbit 50 near the bottom of a borehole 26'. A surface seismic source is denoted by S and a reference receiver at the surface is denoted by R1. A downhole receiver is denoted by 53, while 55 shows an exemplary raypath for seismic waves originating at the source S and received by the receiver 53. The receiver 53 is usually in a fixed relation to the drillbit in the bottom hole assembly. Also shown in FIG. 2 is a raypath 55' from the source S to another position 53' near the bottom of the borehole. This other position 53' may correspond to a second receiver in one embodiment of the disclosure wherein a plurality of seismic receivers are used downhole. In an alternate embodiment of the disclosure, the position 53' corresponds to another position of the receiver 53 when the drillbit and the BHA are at a different depth. It should be noted that for the purposes of the present disclosure, reference to a source at the surface is intended to include not only a source on the land surface but also a source in a body of water at the surface of the earth, or a source positioned near the surface of the earth in a borehole. Similarly reference to a receiver at the surface is intended to include not only a receiver on the land surface but also a receiver in a body of water at the surface of the earth, or a receiver positioned near the surface of the earth in a borehole Raypaths 55 and 55' are shown as curved. This ray-bending commonly happens due to the fact that the velocity of propagation of seismic waves in the earth generally increases with depth. Also shown in FIG. 2 is a reflected ray 61 corresponding to seismic waves that have been produced by the source S, reflected by an interface such as 63, and received by the receiver at 53.

Figure 3:
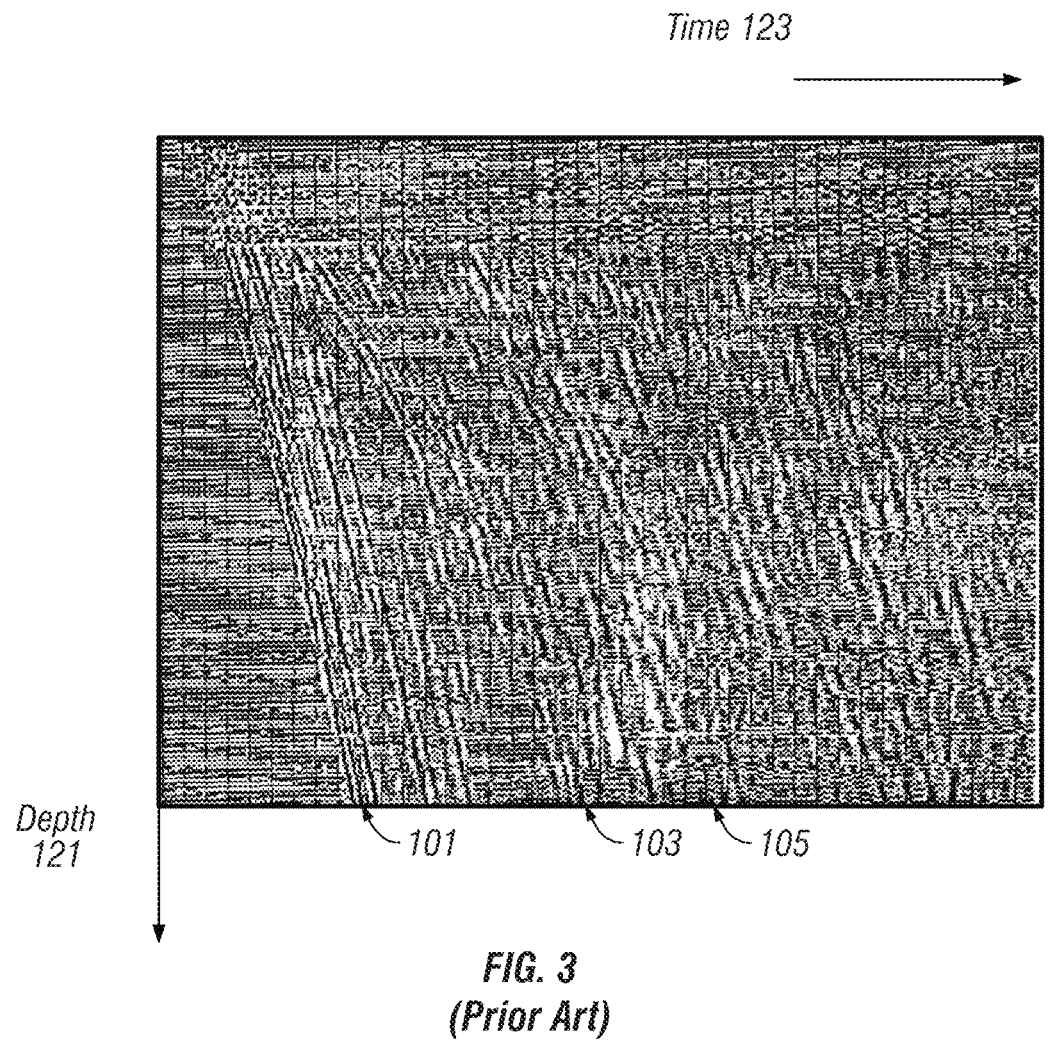
FIG. 3 (Prior Art) shows an example of a vertical seismic profile.

An example of a VSP that would be recorded by such an arrangement is shown in FIG. 3. The vertical axis 121 corresponds to depth while the horizontal axis 123 corresponds to time. The exemplary data in FIG. 3 was obtained using a wireline for deployment of the receivers. Measurements were made at a large number of depths, providing the large number of seismic traces shown in FIG. 3.

Even to an untrained observer, several points are apparent in FIG. 3. One point of interest is the direct compressional wave (P-wave) arrival denoted by 101. This corresponds to energy that has generally propagated into the earth formation as a P-wave. Also apparent in FIG. 3 is a direct shear wave (S-wave) arrival denoted by 103. Since S-waves have a lower velocity of propagation than P-waves, their arrival times are later than the arrival times of P-waves.

Both the compressional and shear wave direct arrivals are of interest since they are indicative of the type of rock through which the waves have propagated. To one skilled in the art, other visual information is seen in FIG. 3. An example of this is denoted by 105 and corresponds to energy that is reflected from a deeper horizon, such as 63 in FIG. 2 and moves up the borehole. Consequently, the "moveout" of this is opposite too the moveout of the direct arrivals (P- or S-). Such reflections are an important part of the analysis of VSP data since they provide the ability to look ahead of the drillbit.

In the present disclosure, for a single measurement during, for example, a connection time, a sequence of several shots is performed. This is defined as a "shooting sequence" and involves activation of the seismic source. During the shooting sequence, the source S and the receiver do not move. The time interval between the shots is a predefined constant quantity known to the downhole processor 77. The number of shots in a sequence may also be known to the downhole processor 77. The exact time when a shooting sequence starts is not known to the downhole processor 77. All that is known a priori is that a shooting sequence occurs at some time after recording is initiated. The downhole processor 77 may record a first-arrival of the seismic wave and corresponding arrival time.

Figure 4:
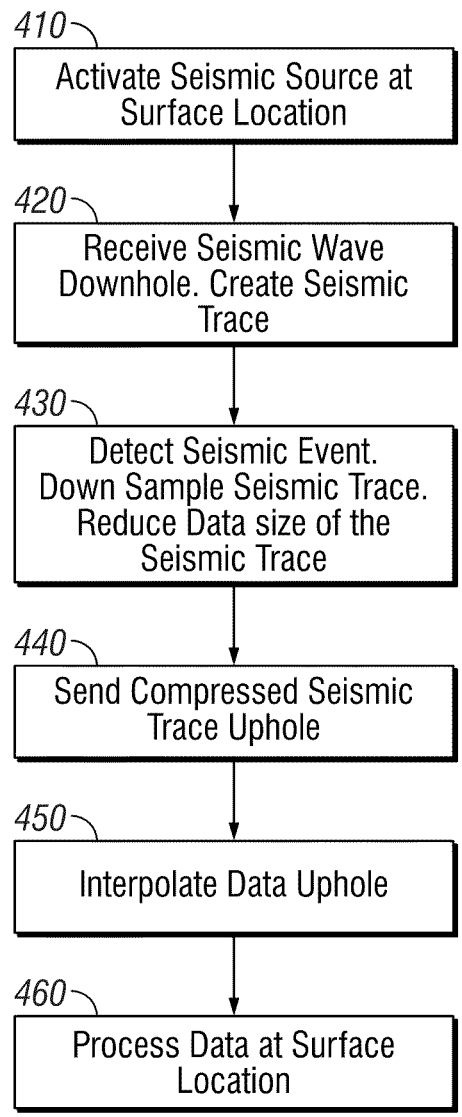
FIG. 4 shows a flowchart of an exemplary embodiment of the present disclosure.

FIG. 4 shows a flowchart of an exemplary method of the present disclosure. In Box 410 a seismic source is activated at a surface location. The resulting seismic waves are detected at a downhole location, such as illustrated, for example, in FIG. 2. Multiple seismic sources at various surface locations may also be activated, and a shooting sequence may be established between them. In Box 420, a seismic trace is created or defined from a seismic wave received at a downhole location in response to the activation of the seismic source S. A first arrival of the seismic wave is recorded at the downhole location. One part of the estimation of the first arrival time is the use of a sliding stack. Typically a receiver 53 in a bottomhole assembly receives the seismic wave, and a processor 77 such as a digital signal processor records seismic wave. This includes the first arrival and a corresponding arrival time. The received seismic wave is recorded to a seismic trace. The seismic traces may be stacked to create a new trace.

In Box 430, the processor 77 creates a compressed trace from the seismic trace. This may include detecting a seismic event (e.g. a first arrival time), down sampling of the seismic trace and reducing the data size of the down sampled trace. The order of the items of Box 430 is interchangeable. In one aspect, down sampling of the seismic trace includes using a low-pass filter or a similar filter to prevent aliasing. In another aspect, the down sampling may be characterized by a sampling frequency less than 250 Hz. In an exemplary embodiment, the down sampling rate may be between 1 ms and 8 ms. Reducing the data size includes one or more methods of compression, such as lossy compression methods. In one exemplary embodiment, the number of bits per sample is reduced from 24 to 5. In another exemplary embodiment, a trace length of 400 ms is represented using less than 255 bits. Other or additional compression algorithm might be used. The compressed seismic trace may be further compressed, for example, by using standard methods to compress a string of numbers.

In Box 440, the compressed seismic trace is sent uphole to a surface location for processing via mud-pulse telemetry. Alternatively, the compressed seismic data may be stored on a suitable storage medium. In Box 450, the compressed seismic data is decompressed using a processor 40 at the surface location. Nonlinear interpolation may be used for decompression, which may include splines such as cubic splines, for example. In one aspect, the interpolated data may then be displayed or stored on a suitable storage medium. In Box 460, the seismic data is processed at the surface location. Processing may include detection of seismic event, i.e., first-arrival, reflections, refractions, S-waves, and tubes, and the evaluation of seismic attributes for the detected events, i.e., time, amplitude, dispersion frequencies and continuity. In addition, the seismic data may be used to describe geological information, such as seismic velocities, locations and characteristics of seismic reflectors, and fluid content, among others. The results of the processing may be saved to a suitable storage medium. Alternatively, the seismic data may be sent to a display.

Figure 5:
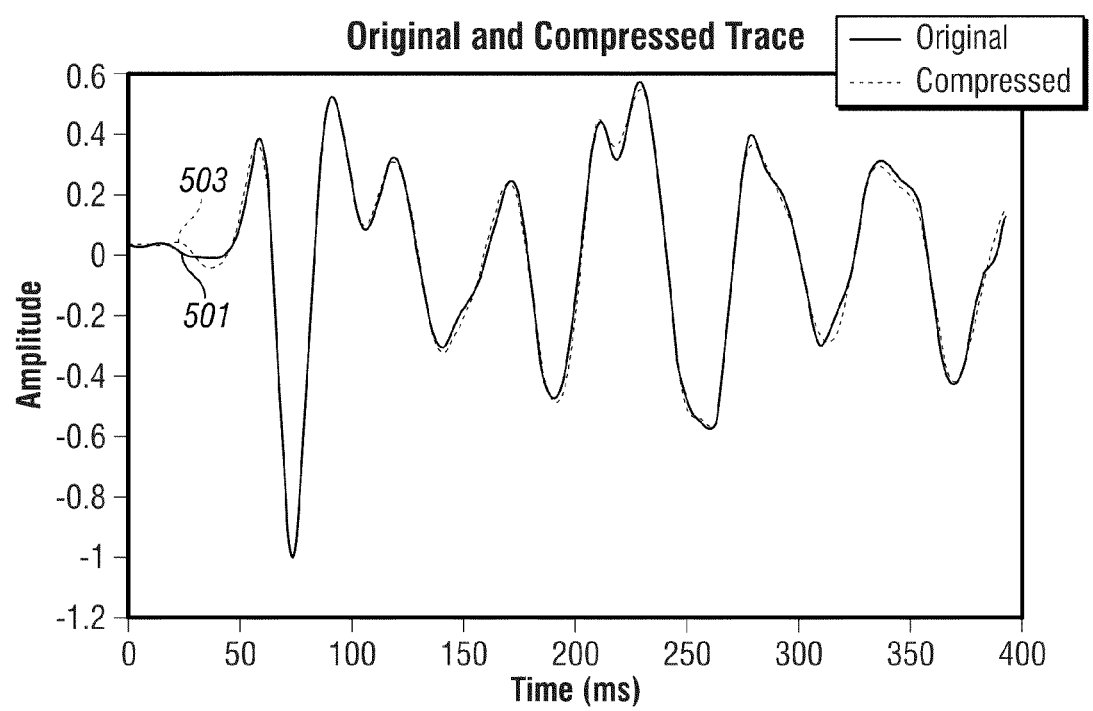
FIG. 5 shows original and compressed data in one aspect of the present disclosure.

FIG. 5 shows original and compressed seismic trace data obtained using the exemplary compression method of the present disclosure. An original data set 501 and a compressed data set 503 are shown and are in good agreement. The original data is recorded using a sample rate of 1 ms.

In one aspect, the present disclosure provides a method of acquiring seismic data which includes activating a seismic source at a surface location; defining a seismic trace of a seismic wave received at a downhole location in response to the activation of the seismic source; and compressing the seismic trace. In one aspect, a processor determines a first arrival the seismic wave at the downhole location. In one aspect, compressing the seismic trace further includes one of: (i) reducing a sampling rate, and (ii) reducing the number of bits in the seismic trace. A low-pass filter may be used on the seismic data during compression. The compressed seismic trace is sent uphole using mud-pulse telemetry where it may be interpolated and reconstructed. This may be done substantially in real-time due to the fact that mud pulse telemetry is used to telemeter the compressed trace to the uphole location. In the context of the present disclosure, the term "real-time" is intended to mean that a compressed trace is sent up before the BHA is moved to a different depth and recording of data starts at the other depth.

For the purpose of the present disclosure, the BHA may be referred to as a "carrier: on which the receivers are disposed. The method of the present disclosure may also be practiced using, as a carrier, a logging tool conveyed on a wireline.

The processing of the data may be accomplished by a downhole processor and/or a surface processor. Implicit in the control and processing of the data is the use of a computer program implemented on a suitable machine readable medium that enables the processor to perform the control and processing. The machine readable medium may include ROMs, EPROMs, EAROMs, Flash Memories and Optical disks.

While the foregoing disclosure is directed to the exemplary embodiments of the disclosure, various modifications will be apparent to those skilled in the art. It is intended that all variations within the scope and spirit of the appended claims be embraced by the foregoing disclosure.

What is claimed is:

1. A method of acquiring seismic data, comprising:
activating a seismic source at a surface location according to a predefined shooting sequence during a seismic measurement, wherein the predefined shooting sequence comprises a plurality of shots at predetermined intervals between successive ones of the plurality of shots; and
using a processor for:
defining a seismic trace of a seismic wave received at a downhole location on a carrier in a borehole in response to the activation of the seismic source; and
creating a compressed seismic trace from the seismic trace by:
detecting a seismic event within the seismic trace, and performing, in response to the detection, at least one of: (i) reducing a sampling rate for the compressed seismic trace in comparison with the seismic trace, and (ii) reducing the number of bits per sample in the compressed seismic trace in comparison with the seismic trace.

2. The method of claim 1 wherein defining the seismic trace further comprises using the predefined shooting sequence for determining a first arrival time of the seismic wave at the downhole location.

3. The method of claim 1 further comprising sending the compressed seismic trace uphole using mud-pulse telemetry substantially in real-time.

4. The method of claim 3 further comprising processing the compressed seismic trace at the surface location to provide an estimate of the defined seismic trace.

5. The method of claim 1 wherein creating a compressed seismic trace further comprises using a low-pass filter.

6. The method of claim 1 further comprising using a non-linear interpolation to up sample the compressed seismic trace at the surface location.

7. The method of claim 6, further comprising processing the compressed seismic trace, including at least one of: i) detecting a seismic event, and ii) evaluating a seismic attribute.

8. The method of claim 7 further comprising using the up sampled seismic data to define at least one of: i) a seismic velocity, ii) a location of a seismic reflector, iii) a characteristic of a seismic reflector, and iv) a fluid content of an earth formation.

9. The method of claim 6 further comprising storing the up sampled seismic data to a suitable storage medium.

10. A system for acquiring seismic data, comprising:
   a seismic source configured to provide seismic energy at a surface location according to a predefined shooting sequence;
   a receiver configured to receive a seismic wave at a downhole location on a carrier in a borehole in response to an activation of the seismic source according to the predefined shooting sequence during a seismic measurement, wherein the predefined shooting sequence comprises a plurality of shots at predetermined intervals between successive ones of the plurality of shots; and
   a downhole processor configured to:
      define a seismic trace of the received seismic wave, and
      create a compressed seismic trace from the seismic trace by:
         detecting a seismic event within the seismic trace, and
         performing, in response to the detection, at least one of: (i) reducing a sampling rate for the compressed seismic trace in comparison with the seismic trace, and (ii) reducing the number of bits per sample in the compressed seismic trace in comparison with the seismic trace.

11. The system of claim 10, wherein the downhole processor is further configured to define the seismic trace by using the predefined shooting sequence for determining a first arrival time of the seismic wave at the downhole location.

12. The system of claim 10 further comprising a communication sub configured to send the compressed seismic trace uphole using mud-pulse telemetry substantially in real-time.

13. The system of claim 12, wherein a processor at the surface location is configured to provide an estimate of the defined seismic trace using the compressed seismic trace.

14. The system of claim 10 wherein the downhole processor is further configured to create a compressed seismic trace using a low-pass filter.

15. A non-transitory computer-readable medium product having stored thereon instructions that when read by at least one processor cause the at least one processor to execute a method, the method comprising:
   defining a seismic trace from a seismic wave received at a downhole location on a carrier in a borehole in response to the activation of a seismic source using a predefined shooting sequence at a surface location during a seismic measurement, wherein the predefined shooting sequence comprises a plurality of shots at predetermined intervals between successive ones of the plurality of shots; and
   creating a compressed seismic trace from the seismic trace by:
      detecting a seismic event within the seismic trace, and
      performing, in response to the detection, at least one of:
         (i) reducing a sampling rate for the compressed seismic trace in comparison with the seismic trace, and
         (ii) reducing the number of bits per sample in the compressed seismic trace in comparison with the seismic trace.

16. The non-transitory computer-readable medium product of claim 15 further comprising at least one of: (i) a ROM, (ii) an EPROM, (iii) an EAROM, (iv) a flash memory, and (v) an optical disk.

* * * * *